April 30, 1968 A. W. SEGIL ET AL 3,380,552
ACOUSTICAL PANEL WITH HONEYCOMB CORE AND
VENTILATION PASSAGEWAYS Filed Nov. 28, 1966 2 Sheets-Sheet 1

INVENTORS
ARTHUR W. SEGIL
RICHARD N. WHITE
BY
Richard C. Lindberg
ATTORNEY

April 30, 1968 A. W. SEGIL ET AL 3,380,552
ACOUSTICAL PANEL WITH HONEYCOMB CORE AND
VENTILATION PASSAGEWAYS
Filed Nov. 28, 1966 2 Sheets-Sheet 2
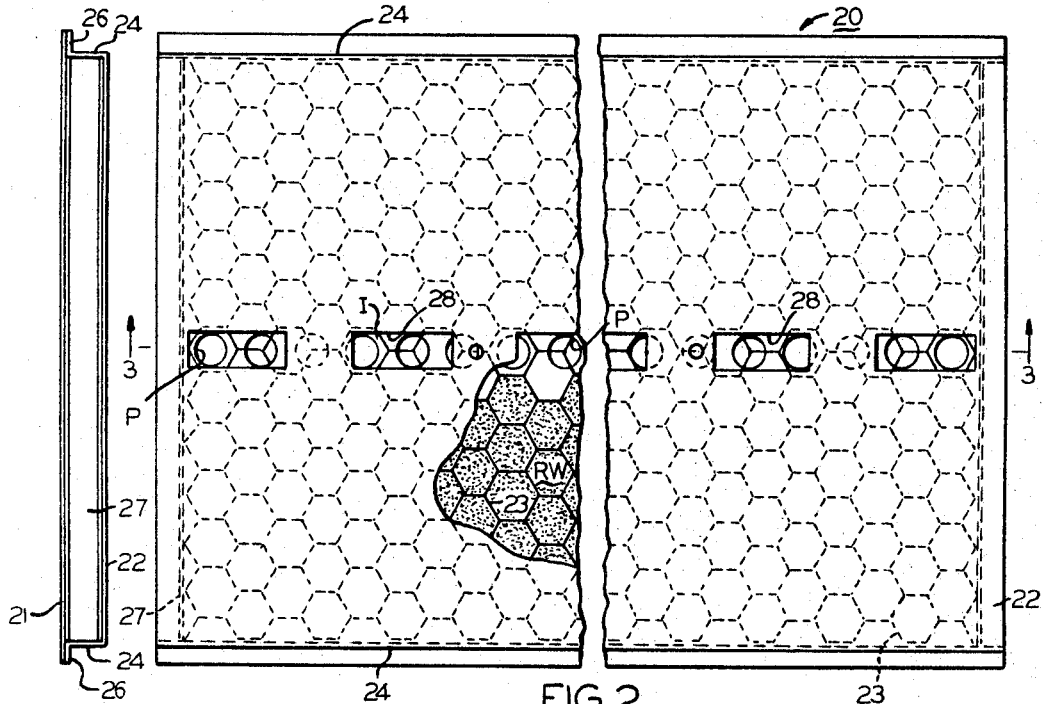
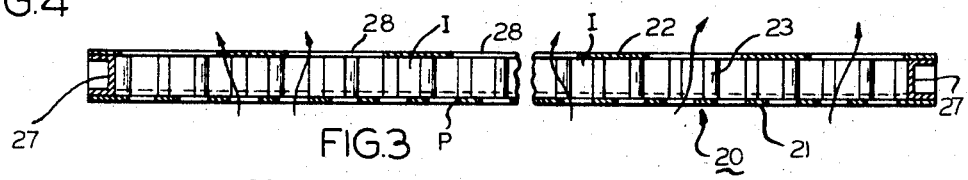
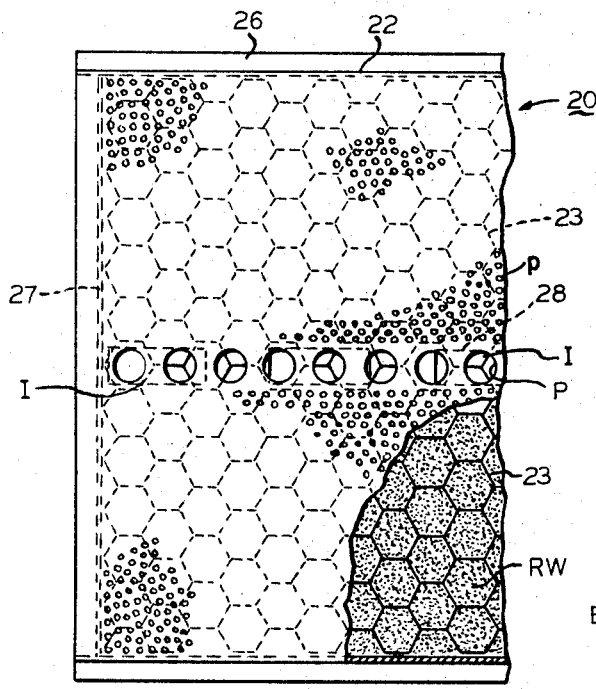
INVENTORS
ARTHUR W. SEGIL
RICHARD N. WHITE
BY
Richard C. Lindberg
ATTORNEY United States Patent Office 3,380,552
Patented Apr. 30, 1968

3,380,552
ACOUSTICAL PANEL WITH HONEYCOMB CORE
AND VENTILATION PASSAGEWAYS
Arthur W. Segil, South Highland Park, and Richard N.
White, Des Plaines, Ill., assignors to Luminous Ceilings,
Inc., Chicago, Ill., a corporation of Illinois
Filed Nov. 28, 1966, Ser. No. 603,077
2 Claims. (Cl. 181—33)

ABSTRACT OF THE DISCLOSURE

An acoustical panel particularly adapted to remove freely therethrough heated air of convection resulting from the operation of fluorescent fixtures located therebelow. The panel comprises a first panel with both large and small perforations and a sound-reflecting panel with only large perforations which are aligned with the large perforations in the first panel. A rigid honeycomb structure filled with sound deadening material is interposed between the two perforated panels and air passageways are provided through the honeycomb structure in alignment with the stated large perforations in the two panels. The small perforations in the first stated panel admit sound waves to the sound deadening material.

---

The structure according to the present invention finds particular application in suspended ceiling construction supporting enlongated fluorescent lamps for lighting the area below the ceiling. The grid composed of the ceiling modules is overlain with acoustical panels serving to absorb sound from the space being illuminated. Heretofore special panels were provided above the lamps, generally a pair in side by side relationship with spacing to provide for removal of the air heated thereby. According to the present invention the acoustical panel is formed with a lower perforated panel spaced from an upper sound reflecting panel and properly stiffened with honeycomb therebetween. The upper panel has a row of relatively large openings so that the openings in the lower panel member and the honeycomb below the row of openings provide passageways for connecting movement of air heated by the lamp, so that the air can be directly removed to the space above the suspended ceiling. If desired, the honeycomb interstices can be filled with rockwool or similar sound absorbing material except for the honeycomb below the row of openings.

In a preferred embodiment of the invention the upper panel is provided with structure for supporting an elongated member extending lengthwise of the lamp and adapted to improve the starting characteristics thereof.

With the foregoing considerations in mind it is a principal object of this invention to provide an improved acoustical panel capable of readily removing by convection air which has been heated by a lamp placed below the same.

Other objects and important features of the invention will be apparent from a study of the specification following taken with the drawings which together describe and illustrate a preferred embodiment of the invention and what is now considered to be the best mode of practising the principles thereof. Other embodiments may be suggested to those having the benefit of the teachings herein, and such other embodiments are intended to be reserved especially as they fall within the scope of the subjoined claims.

In the drawings:

FIG. 2 is a plan view of the acoustical panel according to the present invention;

FIG. 3 is a section taken along the line 3—3 of FIG. 2 looking in the direction of the arrows;

FIG. 4 is an end view of the panel seen in FIG. 2;

FIG. 5 is a bottom fragmentary plan view thereof;

Figure 1:
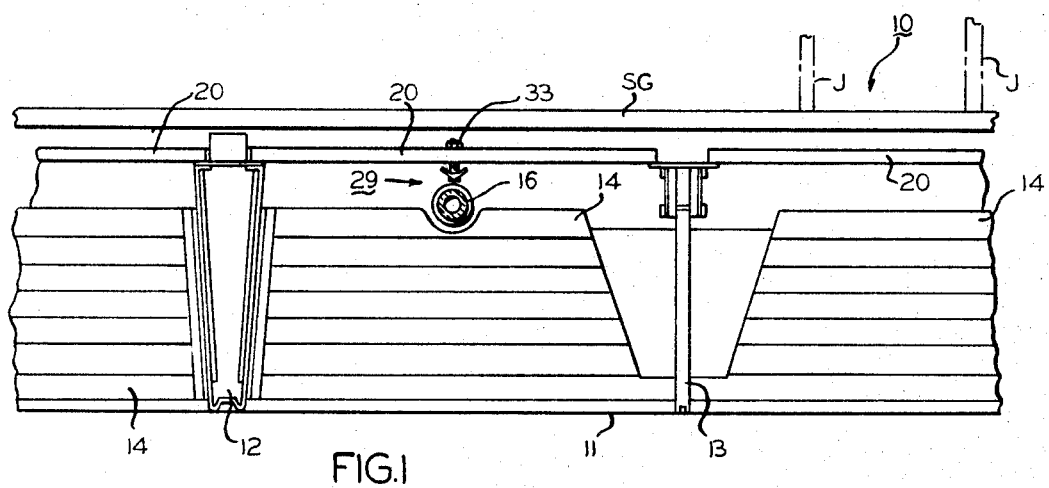
FIG. 1 is a side elevational view of a portion of a suspended ceiling module showing the improved acoustical panel according to the present invention situated thereat.

The invention herein has for its environment a suspended ceiling module 10 consisting of a cross baffle 11 intersected by a ventilating baffle 12 and an intermediate baffle 13. Ventilating baffle 12 and intermediate baffle 13 afford supports for light diffusing baffles 14 for elongated fluorescent tubes or lamps 16 supported at their ends on cross baffle 11.

The assembly thus far described is adapted to be supported in any manner from a support grid SG secured to the underside of a framing structure such as the joists J. The ventilating baffle 12 and the intermediate baffle 13 support acoustical panels 20 having the improvements according to the present invention embodied therein.

As seen particularly in FIGS. 2 to 4, acoustical panel 20 consists of lower perforated panel member 21 and an upper sound reflecting panel 22 separated from panel member 21 by a rigid honeycomb 23. The latter is cemented along its lower and upper edges by contact cement to make a rigid assembly of the upper and lower panels and the rigid honeycomb.

The upper panel 22 has vertical sides 24 with flanges 26 extending therefrom, the latter being held to perforated panel 21 by contact cement. The ends of upper panel 22 and lower panel 21 are joined to end channel members 27, these also being held as a unit by contact cement.

Figure 7:
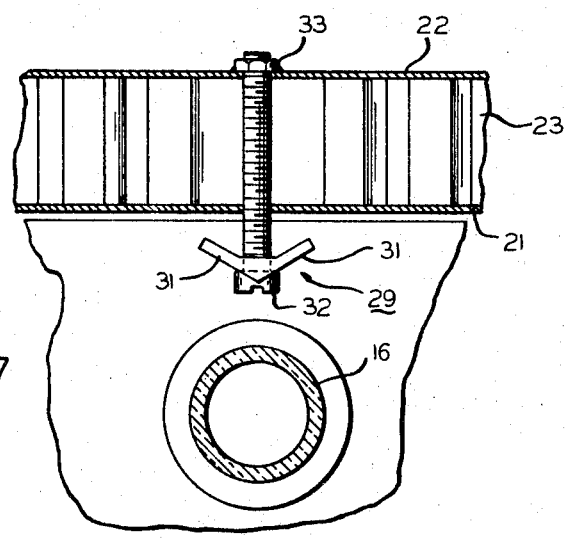
FIG. 7 is a sectional view showing how the panel is adapted to support structure for improving the starting characteristics of the fluorescent lamps.

Structure is provided in the panel 20 for providing a passageway therethrough for the heated air of convection resulting from the operation of the lamp 16 disposed a short distance below the panel 20, as seen in FIGS. 1 and 7. To this end the upper panel 22 is provided with a row of rectangular openings 28 extending longitudinally of panel 22 at the mid-portion thereof. These openings 28 together with a row of openings P in panel 21 subjacent to openings 28 together with interstices I in honeycomb 23 provide for convection of air as indicated by the arrows in FIG. 3.

Figure 6:
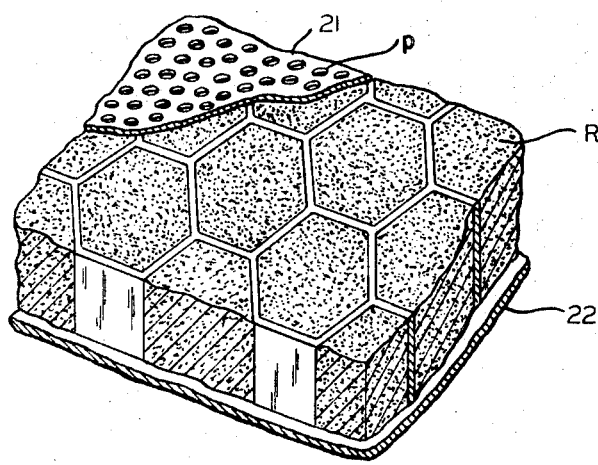
FIG. 6 is a fragmentary isometric view thereof.

As seen in FIG. 3, the perforations P are of larger dimension than other random perforations p in other parts of the lower panel 21, see FIGS. 5 and 6. The remainder of the honeycomb 23 remote from the center row of perforations P may be filled with sound insulating material such as rockwool RW.

Structure is also provided in the panel 20 for an assembly having the function of improving the starting of the lamp 16 by being the electrical ground required by rapid starting. Such assembly has also the function of diffusing the convected heated air for dispersion through the perforations P in panel 21. Such assembly is denoted by the reference numeral 29 and having a flattened V-cross section with wings 31 extending laterally over lamp 16. Assembly 29 is held in position by slotted screws 32 threaded into nuts 33 supported on the upper panel 22.

It will be seen from the description foregoing that there has been provided some new and useful improvements in acoustical panels particularly adapted for use in suspended ceilings. The structure described is also adapted to support an assembly for improving the starting of the fluorescent lamp. The structure makes it simple and convenient to remove the heated air from the lamp directly into the space above the suspended ceiling without requiring that such air be recirculated in the air conditioning system.

While the invention has been described in terms of a preferred embodiment, the scope of the invention is intended to be defined only by the claims here appended.

We claim:

1. An insulating panel particularly adapted to remove freely therethrough heated air of convection resulting from the operation of fluorescent fixtures located below such insulating panel which comprises a substantially flat perforated panel, a substantially flat sound-reflecting panel extending over said flat perforated panel in spaced relation thereto, said flat perforated panel having a row of large openings therein extending lengthwise of said panel and flanked by perforations of greatly smaller opening, said sound-reflecting panel being free from openings except for a row of large openings therein extending lengthwise of said sound-reflecting panel, said latter row of openings being located above the row of openings in the aforesaid flat perforated panel, sound deadening means interposed between said panels including a rigid honeycomb so placed that that portion of the honeycomb extending across said rows of perforations in said flat perforated panel and said sound-reflecting panel provide passageways through said acoustical panel offering substantially free convective movement of air therethrough resulting from operation of said fluorescent fixture.

2. The acoustical panel according to claim 1 wherein said rigid honeycomb is filled with sound deadening material in those parts thereof to each side of the aforesaid rows of openings.

References Cited

UNITED STATES PATENTS

| | | | |
|---|---|---|---|
| 2,587,884 | 3/1952 | Palmer | 181—33 |
| 2,730,942 | 1/1956 | Peterson | 181—33 |
| 3,095,943 | 7/1963 | Kemp | 181—33 |
| 3,132,579 | 5/1964 | LaVigne et al. | 98—40 |
| 3,200,734 | 8/1965 | Burns et al. | 98—40 |
| 3,258,587 | 6/1966 | Segil et al. | 240—9 |
| 3,295,432 | 1/1967 | Palmquist | 98—40 |
| 3,301,163 | 1/1967 | Raider | 181—33 |

ROBERT S. WARD, JR., *Primary Examiner.*